United States Patent [19]

Yen et al.

[11] Patent Number: 4,522,265

[45] Date of Patent: Jun. 11, 1985

[54] METHOD FOR FRACTURING OF OIL SHALE

[75] Inventors: Teh F. Yen, Altadena; Mankin Chan, Los Angeles, both of Calif.

[73] Assignee: University of Southern California, Los Angeles, Calif.

[21] Appl. No.: 124,167

[22] Filed: Feb. 25, 1980

[51] Int. Cl.³ .................... E21B 43/27; C10B 53/06
[52] U.S. Cl. .................... 166/307; 166/308; 208/11 R
[58] Field of Search .............. 299/4, 5; 166/307, 271, 166/308; 241/1, 12; 208/11 R, 11 LE; 175/64

[56] References Cited

U.S. PATENT DOCUMENTS

| | | | |
|---|---|---|---|
| 3,309,211 | 3/1967 | Weiss | 106/72 |
| 3,508,613 | 4/1970 | Huff | 241/1 |
| 3,815,826 | 6/1974 | Aldrich et al. | 241/1 |
| 3,850,477 | 11/1974 | Aldrich et al. | 299/5 |
| 3,870,237 | 3/1975 | Aldrich | 241/1 |
| 3,918,761 | 11/1975 | Aldrich | 299/5 |

OTHER PUBLICATIONS

Van Nostrand's Scientific Encyclopedia, "Oil Shales" p. 1678, published 1976.
"Solvent Power for Coal at Room Temperature", Chemistry and Industry, Jun. 7, 1962, pp. 502–508.
"Spontaneous Fracture of Coal", Fuel, 55, pp. 275–280, (1976).
"Spontaneous Fracture of Coal", Letter in Fuel, 56, p. 345, (1977).
"Chemical Fracture of Coal for Sulphur Liberation", Letter, Fuel, 56, p. 346, (1977).

Primary Examiner—George A. Suchfield
Attorney, Agent, or Firm—Nilsson, Robbins, Dalgarn, Berliner, Carson and Wurst

[57] ABSTRACT

Oil shale, particularly shale having high organic content and/or shallow burial, is fractured by contact with an amino compound, exemplified by ammonia ($NH_3$) and hydrazine ($H_2NNH_2$).

10 Claims, 2 Drawing Figures

METHOD FOR FRACTURING OF OIL SHALE

FIELD OF THE INVENTION

The field of art to which the invention pertains includes the field of chemical communication or disintegration.

BACKGROUND AND SUMMARY OF THE INVENTION

Oil shale reserves constitute a major alternative for rapidly dwindling petroleum reserves. In the United States, it has been estimated that there are well over two trillion barrels of untapped oil locked in oil shale rock. Also, trapped beneath thick layers of shale are enormous amounts of methane in tightly trapped, isolated pockets of gas. For example, in the Appalachian Basin, the gas trapped in Devonian Shale is estimated to be as high as 500 quadrillion cubic feet which far exceeds the total of all other potential natural gas sources, both onshore and offshore. However, access to the oil content of shale and to the trapped natural gas is not readily attained. At the present time there is no feasible process for fast release of the entrapped gas. Shale is a carbonaceous rock whose organic content is substantially kerogen, which is a high-molecular weight organic polymer precursor of oil. One can produce oil from shale by heating to pyrolysis temperatures of 427° to 538° C. The inorganic matrix is usually comprised of dolamite, calcite, quartz and clays. While oil is obtainable from shale using current technology, the available processes are generally energy-intensive particularly those processes which attempt to increase conversion efficiency by crushing the shale down to successively smaller sizes to expose more surface to applied heat.

Experiences with other mining operations have not been very helpful. For example it has been known to chemically fracture such materials as coal using a variety of materials including various amino compounds such as ammonia. However, one would hardly expect that such techniques would be successful with oil shale. Whereas coal is a relatively soft and porous material, oil shale is a very fine-grained sedimentary rock. Permeability is measured in darcys, a unit of porous permeability equal to the permeability of a medium through which the rate of flow of a fluid having 1 centipoise viscosity under a pressure gradient of 1 atmosphere per centimeter would be 1 cubic centimeter per second per square centimeter cross section. Whereas coal has a permeability of about 1000 darcys, shale has a permeability of less than $10^{-5}$ darcys, a hundred million-fold difference. Furthermore, whereas coal is 90% organic, oil shale is 80% or more inorganic.

The present invention provides a method for treating oil shale to induce fracturing of the shale and resides in the discovery that when oil shale has high organic content and/or shallow burial, depending upon the particular shale, one can fracture the shale with liquid or gaseous ammonia or hydrazine as such or in hydrate form. Suitability of a particular shale will depend upon the nature of both the organic and inroganic composition of the shale and cannot be detailed with great precision. Some shale samples are unaffected by the above two amino compounds, as will be amplified on hereinafter. Nevertheless, the process should be applicable to oil shales containing 10 weight percent organic content or more and/or those shales buried at a depth of less than 1500 feet. One can determine the suitability of a particular shale for treatment in accordance with the present invention by conducting an experiment as shown by the examples to be described hereinafter.

More specifically, the present invention provides a method of treating oil shale, having high organic content and/or shallow burial whereby to induce fracturing, comprising the step of contacting the oil shale with an effective amount of an amino compound for a time sufficient to fracture the oil shale. The amino compound can have the formula $RNH_2$ in which R is hydrogen, $=NH_2$ or an aliphatic, aromatic or cyclic hydrocarbon of up to 12 carbon atoms. Ammonia, preferably anhydrous, is the compound of choice, in gaseous or liquid form. The shale can be distinguished from other organic-containing minerals, such as coal, by reference to its low gas permeability, less than $10^{-5}$ darcys, and high inorganic content, as will be discussed in more detail hereinafter.

BRIEF DESCRIPTION OF THE PHOTOGRAPHS

DETAILED DESCRIPTION

Figure 1:
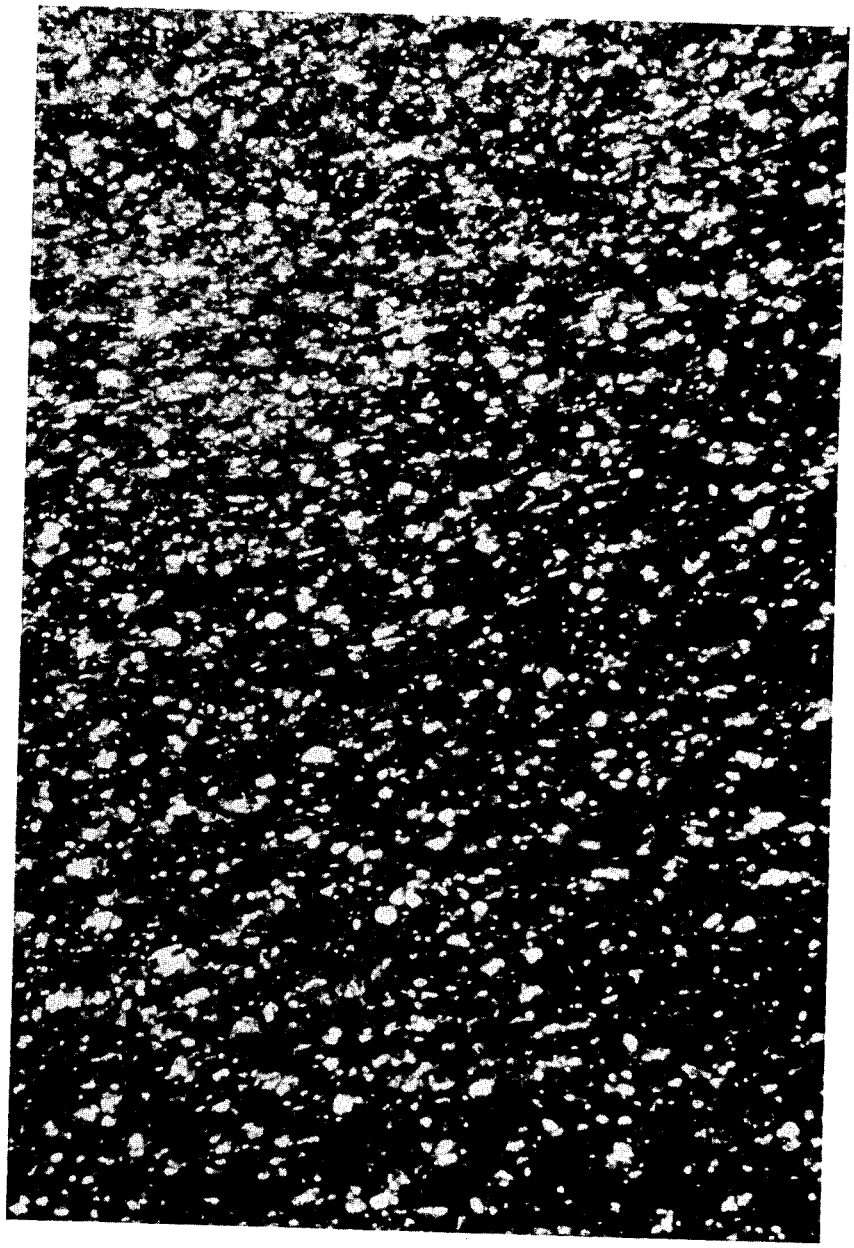
FIG. 1 is a photograph of a thin section of an oil shale sample prior to fracturing, taken through a microscope at 80X magnification under polarized light.

The following description will relate, for exemplification, to primarily the use of anhydrous ammonia in liquid or gaseous form, which is the reactant of choice for various cost-efficient reasons. However, the process can be conducted using other amino compounds such as described by the formula $R-NH_2$ in which R is hydrogen, $=NH_2$ or an aliphatic aromatic or cyclic hydrogen of up to 12 carbon atoms. One example is hydrazine, the use of which will be described hereinafter The method can be carried out in-situ or ex-situ. In the case of surface or ex-situ retorting processes, oil shale is normally mined, crushed and heated to produce oil and gas. Conversion efficiency is increased by crushing the shale down to successively smaller sizes. However this costs considerable energy. In one form of the process, a compound such as ammonia is applied to the crushed shale to fracture it even further. In a batch operation, ammonia liquid can be pumped into a vessel containing a bed of crushed shale and percolated down through the crushed shale where it is removed and pumped back to a reservoir. The vessel can be equipped so as to open at the bottom to discharge the fractured shale. Alternatively, the ammonia can be applied to a retort containing shale at a stage just prior to heating to produce oil and gas. Again, the ammonia can be percolated through a bed of the crushed shale and removed following which the shale can be heated.

For in-situ processes, ammonia vapor can be pumped down each well to induce fine fractures in each shale block it comes into contact with, thereby creating an extensive network of channels. This step can be preceded by the creation of coarse cracks with explosives, as known. Channeling by means of such chemically-induced fractures will increase the retorting efficiency for in-situ retorting processes. It will also provide better gas recovery from gas wells and may be used to stimulate a dead gas well by connecting neighboring untapped gas pockets to the well. Of course, one drawback of the in-situ application of ammonia is that care must be exercised to prevent contamination of underground water because of the toxic nature of ammonia when present in high levels in water. However, in many areas of the country, this does not present a significant environmental hazard. It will be appreciated that by fracturing and weakening the shale, the amount of mechanical energy normally required for crushing or the amount of energy required for retorting, is significantly reduced. The technique also permits the release of stores of natural gas which would otherwise remain untapped.

As above indicated, the present process does not operate successfully in all shales but for most shales requires a minimum of 10% by weight of organic content. On the other hand, certain shales having a shallow burial, i.e., at a depth of less than 1500 feet, can be processed with some measure of success even though they have less than 10% by weight of organic content. It will be appreciated that the nature of the organic component will vary from shale deposit to shale deposit and will vary even within a particular deposit, depending upon the depth and history of the shale, so that no hard and fast rules can be set forth. Nevertheless when the organic content of the shale rises to 10% or higher or when the shale is found at less than 1500 feet from the surface it is believed that the vast majority of such shale will be susceptible to successful processing by the present invention.

To illustrate the present process, a series of experiments were run in which oil shale core samples were subjected to treatment with ammonia, as set forth in the following examples. In the examples, all samples were provided by the Columbia Gas Company of Ohio.

EXAMPLE I

An oil shale core sample taken from a deposit in Richland County, Ohio at a depth of 349 feet was analyzed for its organic content by combusting a fine ground portion of the sample at 570° C. in the presence of air, and measuring the weight loss. The sample was found to contain 11.17 weight percent organic content.

The test samples used in this experiment were rectangular pieces cut to about 1"×1"×¼" (the smaller dimension is the height perpendicular to the bedding plane). The four 1"×¼" surfaces were polished using a fine grinder so that any fractures that formed on the surface would stand out.

A reaction chamber, made from aluminum, was connected by ¼" stainless steel tubings to an ammonia cylinder, a pressure gauge and a vent valve. Two types of cylinders were used, one that gives liquid ammonia and one that gives saturated ammonia vapor, depending on the experiment conducted.

An oil shale sample as above described was placed in the reaction chamber. A valve connecting the cylinder and chamber was opened, and gaseous ammonia was forced by the pressure in the cylinder to enter the reaction chamber and started reacting with the test shale sample. The pressure of the reacting vapor can be adjusted by the feed and vent valve. When the reaction time was over, the ammonia was vented out from the reaction chamber through its vent valve and the shale sample was then taken out for examination.

Starting with a reaction time of 24 hours, runs were carried out with separate shale samples for progressively shorter reaction time until no fracture was observed. This determined the minimum reaction time for a given sample to fracture. The above shale sample showed visible fracture parallel to the bedding plane in a minimum reaction time of 5 minutes. Fractures were observed to start from chipped edges or other weak points, indicating that imperfections in packing render the shale more susceptible to ammonia treatment.

Figure 2:
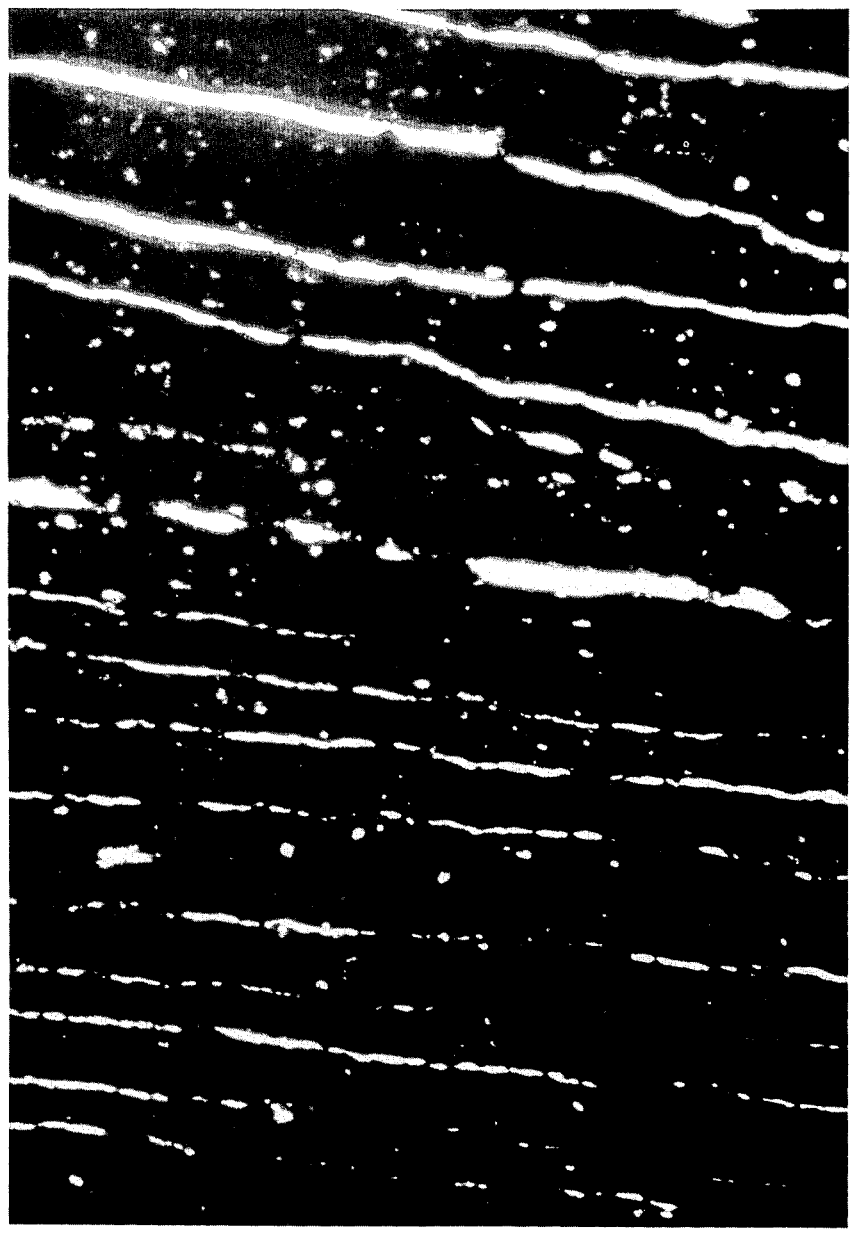
FIG. 2 is a photograph of a thin section of an oil shale sample fractured by treatment using the described process, taken through a microscope at 80X magnification under polarized light.

Pictures of the samples before and after fracturing were taken by cutting a thin section (30 micrometers thick), mounting the section on glass slides and photographing a section through a microscope at 80X under polarized light. FIG. 1 is such a photograph of the shale sample prior to fracturing. FIG. 2 shows the sample subsequent to fracturing and it can be seen that a large amount of fine cracks have occurred about 0.1 mm apart. The extent of fracture of shale samples increased slightly with reaction time for a period of about two hours right after the fracturing started, and remained relatively unchanged afterwards.

EXAMPLE IA

The experiment of Example I was repeated using enough liquid ammonia to cover the sample. The results were quite the same, the samples showing visible fractures parallel to the bedding plane and a minimum reaction time of 5 minutes.

EXAMPLES III-VIII

The procedure of Example I was repeated with core samples obtained from other locations, using ammonia in the form of liquid, saturated vapor and vapor at 65 psi. The shale sample of Example I as well as shale samples from these other locations were also subjected to treatment with hydrazine hydrate (H₂NNH₂·H₂O). Results of all treatments (including that of Example I) are shown in the following table.

|  |  |  |  | Fractured within 20 hr. at room temp. by: | | |
|---|---|---|---|---|---|---|
| Ex. | Source | Burial Depth | Organic Content Wt. % | Ammonia Liquid/ Saturated Vapor (110–140 psi) | Ammonia Vapor @ 65 psi | Hydrazine Hydrate |
| I | Richland County, Ohio | 349' | 11.17 | ++ | ++ | +++ |
| II | Richland County, Ohio | 367' | 14.90 | + | + | + |
| III | Richland County, Ohio | 515' | 8.40 | + | + | ++ |
| IV | Chatauqua County, NY | 2,095' | 3.64 | − | − | − |
| V | Chatauqua County, NY | 2,658' | 8.55 | − | − | − |
| VI | Belmont County, Ohio | 2,457' | 5.10 | + | + | +++ |
| VII | Belmont | 4,440' | 4.90 | − | − | −− |

-continued

| Ex. | Source | Burial Depth | Organic Content Wt. % | Fractured within 20 hr. at room temp. by: | | |
|---|---|---|---|---|---|---|
| | | | | Ammonia Liquid/ Saturated Vapor (110–140 psi) | Ammonia Vapor @ 65 psi | Hydrazine Hydrate |
| VIII | Belmont County, Ohio | 5,557' | 6.00 | — | — | — |

− no fracture
+ slight fracture
+ + extensive fracture
+ + + crumbled

The observation that fractures originate from points of weak packing, such as chipped edges, is in agreement with the results in the above table, indicating that oil shales buried at shallower depths and/or with high organic content (which are usually the causes of loose packing) are in general more susceptible to the chemical induced fracturing.

While it is not desired nor intended to rely upon any particular theory of operation, in view of the fact that oil shale kerogen is insoluble in liquid ammonia at room temperature, it can be hypothesized that the ammonia specifically attacks the bonding between the inorganic and organic components. Therefore, it is hypothesized that a high percentage of organic-inorganic bondings among the interlayer bondings in the shale renders the shale more susceptible to attack by ammonia.

We claim:

1. A method of treating shale to induce fracturing, said shale being a carbonaceous rock whose organic content is substantially kerogen, said shale having a gas permeability of less than $10^{-5}$ darcys, but having sufficient organic content and/or shallow burial, comprising the step of contacting said shale with an effective amount of an amino compound for a time sufficient to fracture said shale.

2. The method of claim 1 in which said amino compound has the formula: $RNH_2$ in which R is hydrogen, $=NH_2$ or an aliphatic, aromatic or cyclic hydrocarbon of up to 12 carbon atoms.

3. The method of claim 2 in which said amino compound is ammonia.

4. The method of claim 3 in which said ammonia is anhydrous.

5. The method of claim 3 in which said ammonia is in gaseous form.

6. The method of claim 3 in which said ammonia is in liquid form.

7. The method of claim 2 in which said compound is hydrazine.

8. The method of claim 7 in which said hydrazine is in hydrate form.

9. The method of any one of claims 1–8 in which said shale has an organic content of at least 10% by weight.

10. The method of any one of claims 1–8 in which said shale has a burial depth of less than 1500 feet.

* * * * *